(12) United States Patent
Wang et al.

(10) Patent No.: US 11,167,744 B2
(45) Date of Patent: Nov. 9, 2021

(54) AI-ENHANCED NONLINEAR MODEL PREDICTIVE CONTROL OF POWER SPLIT AND THERMAL MANAGEMENT OF VEHICLE POWERTRAINS

(71) Applicants: GM GLOBAL TECHNOLOGY OPERATIONS LLC, Detroit, MI (US); Ohio State Innovation Foundation, Columbus, OH (US)

(72) Inventors: Yue-Yun Wang, Troy, MI (US); Yuxing Liu, Columbus, OH (US); Marcello Canova, Columbus, OH (US)

(73) Assignees: GM Global Technology Operations LLC, Detroit, MI (US); Ohio State Innovation Foundation, Columbus, OH (US)

( * ) Notice: Subject to any disclaimer, the term of this patent is extended or adjusted under 35 U.S.C. 154(b) by 335 days.

(21) Appl. No.: 16/441,807

(22) Filed: Jun. 14, 2019

(65) Prior Publication Data

US 2020/0391721 A1 Dec. 17, 2020

(51) Int. Cl.
*B60W 20/11* (2016.01)
*B60W 20/12* (2016.01)

(52) U.S. Cl.
CPC ............ *B60W 20/12* (2016.01); *B60W 20/11* (2016.01); *B60W 2510/244* (2013.01); *B60W 2556/50* (2020.02)

(58) Field of Classification Search
CPC .............. B60K 2006/4825; B60K 6/48; Y02T 10/62; B60W 10/06; B60W 10/08; B60W 20/11; B60W 20/12; B60W 2510/244; B60W 2552/20; B60W 2556/05; B60W 2710/0666; B60W 2710/083; B60W 50/0097

See application file for complete search history.

(56) References Cited

U.S. PATENT DOCUMENTS 6,275,004 B1 8/2001 Tamai et al.
6,752,131 B2 6/2004 Poola et al.
(Continued)

FOREIGN PATENT DOCUMENTS

WO 2016198763 A1 12/2016

*Primary Examiner* — Hunter B Lonsberry
*Assistant Examiner* — Matthew J. Reda
(74) *Attorney, Agent, or Firm* — Quinn IP Law (57) ABSTRACT

Presented are model predictive control (MPC) systems, methods, and devices for regulating operation of hybrid powertrains. A method of controlling a hybrid powertrain includes a controller determining path plan data, including a vehicle origin, destination, and predicted path. Based on this path plan data, the controller estimates vehicle velocities for multiple rolling road segments of the predicted path and, based on the estimated velocities, determines an estimated power request—transmission input torque and/or vehicle axle torque—for each road segment. The controller calculates a minimum cost function such that total fuel consumption to generate the engine power output is minimized. Minimizing the cost function is subject to battery pack current limits and state of charge (SOC) terminal costs at the ends of the rolling road segments. Command signals are sent to the engine and motor to output engine and motor torque based on the calculated minimum cost function.

20 Claims, 4 Drawing Sheets

(56) References Cited

U.S. PATENT DOCUMENTS

| | | |
|---|---|---|
| 6,994,072 B2 | 2/2006 | Kuo et al. |
| 7,128,047 B2 | 10/2006 | Kuo et al. |
| 7,367,313 B2 | 5/2008 | Chang et al. |
| 7,463,970 B2 | 12/2008 | Livshiz et al. |
| 7,689,343 B2 | 3/2010 | Dagci et al. |
| 7,725,244 B2 | 5/2010 | Itoga et al. |
| 8,000,882 B2 | 8/2011 | Ramappan et al. |
| 8,210,158 B2 | 7/2012 | Kang et al. |
| 8,316,818 B2 | 11/2012 | Ramappan et al. |
| 8,347,860 B2 | 1/2013 | Kang et al. |
| 8,565,949 B2 | 10/2013 | Christman et al. |
| 8,776,737 B2 | 7/2014 | Bayer et al. |
| 9,074,551 B2 | 7/2015 | Yun et al. |
| 9,142,980 B2 | 9/2015 | Lee |
| 9,334,815 B2 | 5/2016 | Cygan, Jr. et al. |
| 9,551,248 B2 | 1/2017 | Warey et al. |
| 9,660,462 B2 | 5/2017 | Jeon |
| 9,689,321 B2 | 6/2017 | Kang et al. |
| 9,689,339 B2 | 6/2017 | Kang et al. |
| 2004/0178756 A1* | 9/2004 | Zhenxing .............. B60L 15/025<br>318/432 |
| 2004/0230376 A1* | 11/2004 | Ichikawa ................ G01C 21/26<br>702/2 |
| 2008/0284385 A1 | 11/2008 | Namuduri et al. |
| 2011/0022255 A1* | 1/2011 | Yamada ............ B60W 50/0097<br>701/22 |
| 2011/0215767 A1 | 9/2011 | Johnson et al. |
| 2011/0247587 A1 | 10/2011 | Chen |
| 2011/0248675 A1 | 10/2011 | Shiu et al. |
| 2012/0181854 A1 | 7/2012 | Gopalakrishnan et al. |
| 2012/0206296 A1 | 8/2012 | Wan |
| 2012/0232731 A1* | 9/2012 | Sujan .................... B60W 10/08<br>701/22 |
| 2013/0080023 A1 | 3/2013 | Livshiz et al. |
| 2013/0080026 A1 | 3/2013 | Kang et al. |
| 2013/0119935 A1 | 5/2013 | Sufrin-Disler et al. |
| 2013/0127399 A1 | 5/2013 | Tang et al. |
| 2014/0152232 A1 | 6/2014 | Johnson et al. |
| 2016/0258410 A1 | 9/2016 | Cygan, Jr. et al. |
| 2016/0362020 A1 | 12/2016 | Shepley et al. |

* cited by examiner

AI-ENHANCED NONLINEAR MODEL PREDICTIVE CONTROL OF POWER SPLIT AND THERMAL MANAGEMENT OF VEHICLE POWERTRAINS

The present disclosure relates generally to motor vehicle powertrains. More specifically, aspects of this disclosure relate to model predictive control strategies for powertrain systems of electric-drive vehicles.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving power through an automatic or manually shifted power transmission to the vehicle's final drive system (e.g., differential, axle shafts, road wheels, etc.). Automobiles have historically been powered by a reciprocating-piston type internal combustion engine (ICE) assembly due to its ready availability and relatively inexpensive cost, light weight, and efficiency. Such engines include spark-ignited (SI) gasoline engines, compression-ignited (CI) diesel engines, six-stroke architectures, and rotary engines, as some non-limiting examples. Hybrid electric and full electric vehicles, on the other hand, utilize alternative power sources to propel the vehicle, such as battery-powered or fuel-cell-powered traction motors, and therefore minimize or eliminate reliance on a fossil-fuel based engine for tractive power.

A full electric vehicle (FEV)—colloquially referred to as an "electric car"—is a type of electric-drive vehicle configuration that altogether removes the internal combustion engine and attendant peripheral components from the powertrain system, relying solely on electric traction motors for propulsion and for supporting accessory loads. The engine, fuel supply system, and exhaust system of an ICE-based vehicle are replaced with a single or multiple traction motors, a traction battery back, and battery cooling and charging electronics in an FEV. Hybrid vehicle powertrains, in contrast, employ multiple sources of tractive power to propel the vehicle, most commonly operating an internal combustion engine assembly in conjunction with a battery-powered or fuel-cell-powered electric motor. Since hybrid vehicles are able to derive their power from sources other than the engine, hybrid electric vehicle (HEV) engines may be turned off, in whole or in part, while the vehicle is propelled by the electric motor(s).

There are three primary types of hybrid vehicle powertrain architectures employed in automotive applications: parallel hybrid, series hybrid, and series-parallel ("power-split") hybrid configurations. Series hybrid architectures, for example, derive all tractive power from electric motors and therefore eliminate any driving mechanical connection between the engine and final drive members. In this case, the engine functions solely as a regenerative energy source, driving an electric generator that charges the vehicle's onboard traction battery pack. By way of comparison, the engine and motor/generator assemblies in parallel hybrid architectures each has a driving mechanical coupling to the power transmission and, thus, the vehicle's road wheels. As the name implies, series-parallel hybrid architectures combine features from both parallel hybrid and series hybrid powertrains. With gas-only, electric-only and motor-assist operating modes, the engine and motor work independently or jointly—in parallel or in series—depending on the desired vehicle speed, overall vehicle power demand, and state-of-charge (SOC) of the battery.

One of the many available types of parallel hybrid powertrains is the parallel two-clutch (P2) architecture, which may be typified by a single engine, an automatic power transmission, and a single motor/generator unit (MGU) that is "side attached" between the engine and transmission in parallel power-flow communication to the engine. Mechanically interposed between the engine and motor is a disconnect clutch that, unlike a standard torque converter lockup clutch, drivingly disengages the engine from both the MGU and transmission. The engine disconnect clutch allows the MGU to be operated independent of the engine to propel the vehicle or regenerate the traction battery pack more efficiently during vehicle deceleration and braking while the engine is drivingly detached from the transmission. The P2 architecture also helps to eliminate engine friction during regenerative braking operations, and allows the motor/generator to recover more energy. Comparatively, the electric machine ("E-machine") in a P0 mild-hybrid architecture is connected, e.g., via chain or belt drive, on the front-end accessory drive (FEAD) of the internal combustion engine. For P1 architectures, the E-machine is connected directly to the engine's crankshaft, whereas the E-machine in P3 architectures is connected directly to the power transmission, e.g., through a gear train.

SUMMARY

Disclosed herein are model predictive control (MPC) systems for regulating operation of hybrid powertrains, methods for making and methods for operating disclosed vehicles, hybrid powertrains, and MPC systems, and electric-drive vehicles with closed-loop MPC capabilities. By way of example, there are presented control algorithms with artificial intelligence (AI) enhanced, nonlinear MPC of power split output and thermal management of HEV and plug-in hybrid electric vehicle (PHEV) powertrains. A representative methodology optimizes energy management and efficiency of HEV/PHEV power split using nonlinear MPC that is based on driver behavior data and route preview information. A terminal cost on battery state of charge (SOC) at a predicted horizon may be imposed to manage traction battery pack SOC while minimizing fuel consumption through electric-assisted propulsion or engine load-up and load-down shifting. Disclosed methods may calibrate and adapt the weights on the MPC cost function using dynamic programming techniques and route preview information. In addition, one or more MPC cost function weights may be estimated as equivalent fuel factors based on predicted preview route information. MPC weights may optionally be adapted using predicted and historic vehicle data, current state of charge, etc.

Also presented herein are control algorithms with AI-enhanced, nonlinear MPC for energy and thermal management of electric-drive vehicles equipped with an electrically heated catalyst (EHC) in an exhaust aftertreatment system to reduce cold start emissions. These methodologies formulate MPC to minimize trip fuel consumption and reduce catalyst light-off time with terminal constraint on a minimum battery pack SOC. Decoupled methods may calibrate one or more of the MPC cost function weights as fuel equivalence ratios with respect to motor power and catalyst heating power. These methods may employ a systematic approach with MPC control to optimize fuel consumption for power split operation and catalyst heating. In this example, MPC cost function weights may consist of two uniquely defined equivalent fuel factors. Disclosed methods may calibrate the battery (chemical energy) equivalence fuel factor and the catalyst (thermal energy) fuel equivalence factor, while providing for adaptation of MPC weights using predicted and historic vehicle data.

Attendant benefits for at least some of the disclosed concepts include nonlinear MPC control systems that optimize energy consumption and increase battery life expectancy for electric-drive vehicles. In addition to improving energy management and extending vehicle range performance, disclosed features also help to improve powertrain response time for hybrid vehicles during power split maneuvers and related transient operating modes. With proposed AI-enhanced MPC powertrain control architectures and methodologies, increased fuel economy and reduced emissions are realized with minimal additional cost and reduced powertrain calibration time.

Aspects of this disclosure are directed to methods for making and methods for using any of the disclosed vehicles, powertrains, and/or powertrain control systems. In an example, a method is presented for governing operation of a hybrid powertrain of a motor vehicle. This vehicle powertrain includes an engine assembly and a traction motor that, independently or jointly, drive one or more of the vehicle's road wheels to thereby propel the vehicle. The vehicle is also equipped with a traction battery pack for selectively powering the traction motor and, optionally, the vehicle's accessories. A resident or remote vehicle controller, which may be embodied as a distributed network of controllers or control modules, regulates operation of the traction motor and engine assembly.

The above representative method includes, in any order and in any combination with any of the above and below disclosed options and features: determining, via the vehicle controller, e.g., based on selections received from an operator through a suitable human machine interface (HMI), path plan data including a vehicle origin, a vehicle destination, and a predicted path for the vehicle to travel from origin to destination; determining, via the vehicle controller, e.g., based on the path plan data and memory-stored map information, respective estimated vehicle velocities for multiple rolling road segments of the predicted path; determining, via the vehicle controller based on the estimated velocities, respective estimated power requests for the rolling road segments, each estimated power request including a vehicle axle torque and/or a transmission input torque; calculating, via the vehicle controller, a minimum cost function of motor power such that a summation of fuel consumption to generate the engine power outputs for the rolling road segments is minimized, wherein calculating the minimum cost function is subject to maximum and minimum battery current limits of the traction battery pack and SOC terminal costs at ends of the rolling road segments; and transmitting, via the vehicle controller, an engine command signal to the engine and a motor command signal to the motor to output engine torque and motor torque, respectively, based on the calculated minimum cost function of motor power.

Additional aspects of this disclosure are directed to electric-drive vehicles with closed-loop, AI-enhanced nonlinear MPC capabilities. As used herein, the terms "vehicle" and "motor vehicle" may be used interchangeably and synonymously to include any relevant vehicle platform, such as passenger vehicles (e.g., HEV, PHEV, fuel cell hybrid, fully and partially autonomous, etc.), commercial vehicles, industrial vehicles, tracked vehicles, off-road and all-terrain vehicles (ATV), motorcycles, farm equipment, watercraft, aircraft, etc. While not per se limited, aspects of the disclosed concepts may be particularly suitable for P0, P2 and P3 hybrid powertrain architectures. In an example, an electric-drive vehicle includes a vehicle body with multiple road wheels and other standard original equipment. Mounted on the vehicle body is one or more electric traction motors that selectively drive one or more of the road wheels to thereby propel the vehicle. Also mounted on the vehicle body is an engine assembly that operates, independently or cooperatively with the traction motor(s), to drive one or more of the vehicle's road wheels. A traction battery pack or other suitable rechargeable energy storage system (RESS) is operable to power the electric traction motor(s).

Continuing with the above example, the electric-drive vehicle also includes a vehicle controller or a network of distributed controllers that regulates operation of the traction motor(s), battery pack, and engine assembly. The vehicle controller is programmed to determine path plan data, including a vehicle origin, destination, and predicted path to travel from the vehicle origin to the vehicle destination. Based on the path plan data, the controller determines estimated vehicle velocities for multiple rolling road segments of the predicted path and, based on these estimated velocities, estimates a respective power request—vehicle axle torque and/or transmission input torque—for each rolling road segment. The controller then calculates a minimum cost function of motor power such that total fuel consumption to generate the engine power output for the rolling road segments is minimized. Calculating the minimum cost function is subject to, among other limitations and coefficients, maximum and minimum battery current limits of the traction battery pack and SOC terminal cost at ends of the rolling road segments. Command signals are sent to the engine and motor to output engine torque and motor torque based on the calculated minimum cost function.

For any of the disclosed systems, methods, and devices, calculating the minimum cost function is further subject to maximum and minimum battery pack SOC state constraints. In the same vein, calculating the minimum cost function may be further subject to maximum and minimum engine power limit constraints and maximum and minimum motor power limit constraints. As yet a further option, calculating the minimum cost function is further subject to an SOC charge sustaining constraint in which the SOC of the traction batter pack at the vehicle destination is substantially equal to the SOC of the traction batter pack at the vehicle origin.

Additional aspects of the present disclosure are directed to techniques, algorithms, or logic for operating or assembling any of the disclosed systems and devices. Aspects of the present disclosure are also directed to MPC systems for governing operation of automotive and non-automotive hybrid powertrains. Also presented herein are non-transitory, computer readable media storing instructions executable by at least one of one or more processors of one or more programmable control units, such as an electronic control unit (ECU) or powertrain control module, to govern operation of a disclosed vehicle, system or device.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a normal driving surface.

Figure 1:
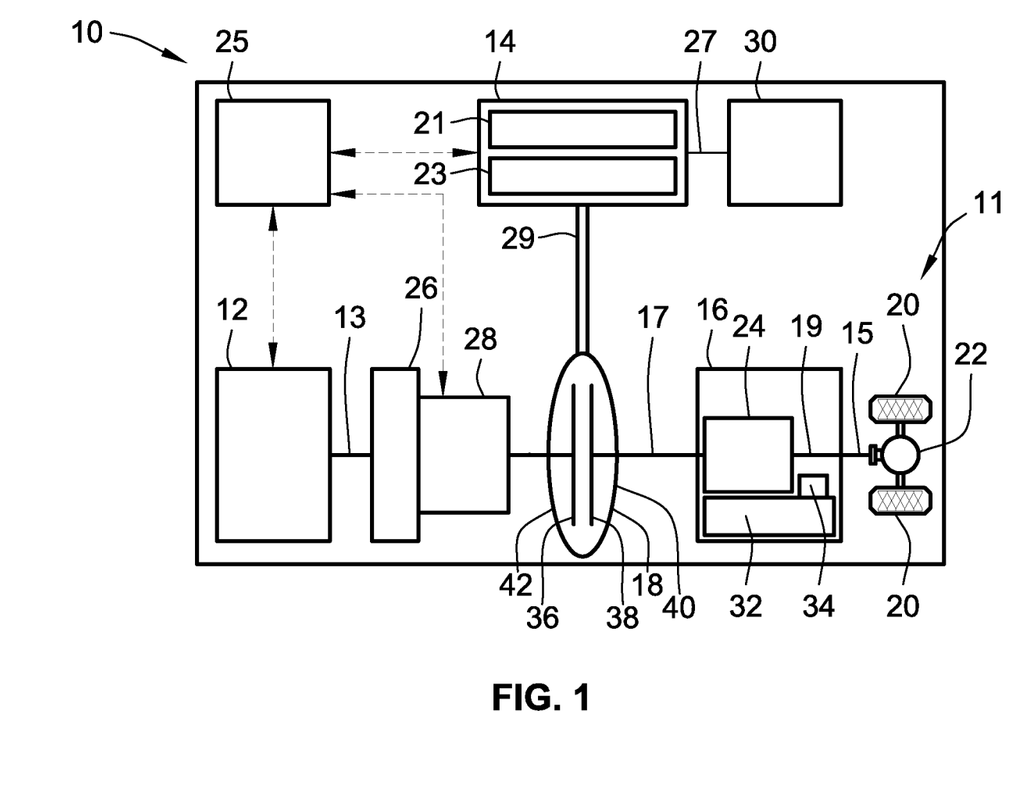
FIG. 1 is a schematic illustration of a representative electric-drive motor vehicle with a hybrid powertrain having an engine assembly and an electric motor/generator unit drivingly connected to a final drive system via a multi-speed power transmission in accordance with aspects of the present disclosure.

Referring now to the drawings, wherein like reference numbers refer to like features throughout the several views, there is shown in FIG. 1 a schematic illustration of a representative automobile, which is designated generally at 10 and portrayed herein for purposes of discussion as a passenger vehicle with a parallel two-clutch (P2) hybrid-electric powertrain. In particular, the illustrated powertrain is generally composed of a single engine 12 and a single motor 14 that operate, individually and in concert, to transmit tractive power to a multi-speed power transmission 16 through a hydrokinetic torque converter (TC) assembly 18 to drive one or more road wheels 20 of the vehicle's final drive system 11. The illustrated automobile 10—also referred to herein as "motor vehicle" or "vehicle" for short—is merely an exemplary application with which novel aspects and features of this disclosure can be practiced. In the same vein, implementation of the present concepts into a P2-hybrid powertrain should also be appreciated as an exemplary application of the novel concepts disclosed herein. As such, it will be understood that aspects and features of the present disclosure can be applied to other vehicle powertrain architectures and utilized for any logically relevant type of motor vehicle. Lastly, only select components have been shown and will be described in additional detail herein. Nevertheless, the vehicles, powertrains, and control systems discussed below may include numerous additional and alternative features, and other available peripheral components, for carrying out the various methods and functions of this disclosure.

The representative vehicle powertrain system is shown in FIG. 1 with a prime mover, such as a restartable internal combustion engine (ICE) assembly 12, that is drivingly connected to a driveshaft 15 of a final drive system 11 by a multi-speed automatic power transmission 16. The engine 12 transfers power, preferably by way of torque via an engine crankshaft 13 ("engine output member"), to an input side of the transmission 16. According to the illustrated example, the ICE assembly 12 rotates an engine-driven torsional damper assembly 26 and, through the torsional damper assembly 26, an engine disconnect device 28. This engine disconnect device 28, when operatively engaged, transmits torque received from the ICE assembly 12 by way of the damper 26 to input structure of the TC assembly 18. The transmission 16, in turn, is adapted to receive, selectively manipulate, and distribute tractive power from the engine 12 and motor 14 to the vehicle's final drive system 11—represented herein by a driveshaft 15, rear differential 22, and a pair of rear road wheels 20—and thereby propel the hybrid vehicle 10. The power transmission 16 and torque converter 18 of FIG. 1 may share a common transmission oil pan or "sump" 32 for supply of hydraulic fluid, as well as a shared transmission pump 34 for sufficient hydraulic pressure to activate the elements of the transmission 16, the TC assembly 18 and, for some implementations, the engine disconnect device 28.

The ICE assembly 12 operates to propel the vehicle 10 independently of the electric traction motor 14, e.g., in an "engine-only" operating mode, or in cooperation with the motor 14, e.g., in a "motor-boost" operating mode. In the example depicted in FIG. 1, the ICE assembly 12 may be any available or hereafter developed engine, such as a compression-ignited diesel engine or a spark-ignited gasoline or flex-fuel engine, which is readily adapted to provide its available power output typically at a number of revolutions per minute (RPM). Although not explicitly portrayed in FIG. 1, it should be appreciated that the final drive system 11 may take on any available configuration, including front wheel drive (FWD) layouts, rear wheel drive (RWD) layouts, four-wheel drive (4WD) layouts, all-wheel drive (AWD) layouts, etc.

FIG. 1 also depicts an electric motor/generator unit 14 or other suitable traction motor that operatively connects via a motor support hub, shaft, or belt 29 ("motor output member") to torque converter 18, and via torque converter 18 to an input shaft 17 ("transmission input member") of the transmission 16. The motor/generator unit 14 may be directly coupled onto a TC input shaft or drivingly mounted to a housing portion of the torque converter 18. The electric motor/generator unit 14 is composed of an annular stator 21 circumscribing and concentric with a rotor 23. Electric power is provided to the stator 21 through electrical conductors or cables 27 that pass through the motor housing in suitable sealing and insulating feedthroughs (not illustrated). Conversely, electric power may be provided from the MGU 14 to an onboard traction battery pack 30, e.g., through regenerative braking. Operation of any of the illustrated powertrain components may be governed by an onboard or remote vehicle controller, such as programmable electronic control unit (ECU) 25. While shown as a P2 hybrid-electric architecture with a single motor in parallel power-flow communication with a single engine assembly, the vehicle 10 may employ other powertrain configurations, including P0, P2.5, and P3 hybrid powertrains, any of which may be adapted for an HEV, PHEV, range-extended hybrid vehicle, fuel-cell hybrid vehicle, etc.

Power transmission 16 may use differential gearing 24 to achieve selectively variable torque and speed ratios between transmission input and output shafts 17 and 19, respectively, e.g., while sending all or a fraction of its power through the variable elements. One form of differential gearing is the epicyclic planetary gear arrangement. Planetary gearing offers the advantage of compactness and different torque and speed ratios among all members of the planetary gearing subset. Traditionally, hydraulically actuated torque establishing devices, such as clutches and brakes (the term "clutch" used to reference both clutches and brakes), are selectively engageable to activate the aforementioned gear elements for establishing desired forward and reverse speed ratios between the transmission's input and output shafts. While envisioned as an 8-speed automatic transmission, the power transmission 16 may optionally take on other suitable configurations, including Continuously Variable Transmission (CVT) architectures, automated-manual transmissions, etc.

As indicated above, ECU 25 is constructed and programmed to govern, among other things, operation of the engine 12, motor 14, transmission 16, TC 18, and disconnect device 28. Control module, module, controller, control unit, electronic control unit, processor, and any permutations thereof, may be used interchangeably and synonymously to mean any one or various combinations of one or more of logic circuits, combinational logic circuit(s), Application Specific Integrated Circuit(s) (ASIC), electronic circuit(s), central processing unit(s) (e.g., microprocessor(s)), input/output circuit(s) and devices, appropriate signal conditioning and buffer circuitry, and other components to provide the described functionality, etc. Associated memory and storage (e.g., read only, programmable read only, random access, hard drive, tangible, etc.)), whether resident, remote or a combination of both, store processor-executable software and/or firmware programs or routines.

Software, firmware, programs, instructions, routines, code, algorithms, and similar terms may be used interchangeably and synonymously to mean any processor-executable instruction sets, including calibrations and look-up tables. The ECU 25 may be designed with a set of control routines executed to provide desired functions. Control routines are executed, such as by a central processing unit, and are operable to monitor inputs from sensing devices and other networked control modules, and execute control and diagnostic routines to govern operation of devices and actuators. Such inputs may include vehicle speed and acceleration data, speed limit data, traffic light status and location data, road gradient data, stop sign location data, traffic flow data, geospatial data, road and lane-level data, vehicle dynamics data, sensor data, etc. Routines may be executed in real-time, continuously, systematically, sporadically and/or at regular intervals, for example, each 100 microseconds, 3.125, 6.25, 12.5, 25 and 100 milliseconds, etc., during vehicle use or operation. Alternatively, routines may be executed in response to occurrence of an event during operation of the vehicle 10.

Hydrokinetic torque converter assembly 18 of FIG. 1 operates as a fluid coupling for operatively connecting the engine 12 and motor 14 with the internal epicyclic gearing 24 of the power transmission 16. Disposed within an internal fluid chamber of the torque converter assembly 18 is a bladed impeller 36 juxtaposed with a bladed turbine 38. The impeller 36 is situated in serial power-flow fluid communication with the turbine 38, with a stator (not shown) interposed between the impeller 36 and turbine 38 to selectively alter fluid flow therebetween. The transfer of torque from the engine and motor output members 13, 29 to the transmission 16 via the TC assembly 18 is through stirring excitation of hydraulic fluid, such as transmission oil, inside the TC's internal fluid chamber caused by rotation of the turbine and impeller blades. To protect these components, the torque converter assembly 18 is constructed with a TC pump housing, defined principally by a transmission-side pump shell 40 fixedly attached, e.g., via electron beam welding, MIG or MAG welding, laser welding, and the like, to an engine-side pump cover 42 such that a working hydraulic fluid chamber is formed therebetween.

Energy management and optimization for HEV and PHEV power split output control may be conducted in scenarios in which most/all of the vehicle's velocity trajectories are known or, alternatively, in scenarios in which most/all of the vehicle's velocity trajectories are predicted for a given travel route from vehicle location/origin to vehicle target/destination. For known vehicle velocities of a trip, optimal energy management evaluations may include determining the power split between engine power output $P_{eng}$ and motor power output $P_{MGU}$ (where requested power $P_{req}=P_{eng}+P_{MGU}$ is predetermined by the velocity profile) such that the total fuel consumption is minimized. Power split determination to minimize fuel consumption, however, may be delimited by component constraints and sustaining a desired battery State of Charge SoC as follows:

$$\min_{P_{MGU}(t)} \int_0^{t_f} \dot{m}_f(P_{req}(t) - P_{MGU}(t))dt \qquad (1)$$

-continued subject to:

$$\frac{dSoC}{dt}(t) = -\frac{I(SoC(t), P_{MGU}(t))}{Q_{nom}}$$

$$P_{MGU}^{min}(\omega_{MGU}(t)) \leq P_{MGU}(t) \leq P_{MGU}^{max}(\omega_{MGU}(t))$$

$$P_{eng}^{min}(\omega_{eng}(t)) \leq P_{req}(t) - P_{MGU}(t) \leq P_{eng}^{max}(\omega_{eng}(t))$$

$$I^{min} \leq I(t) \leq I^{max}$$

$$SoC_{min} \leq SoC(t) \leq SoC_{max}$$

$$SoC(t_f) = SoC(0) \leq SoC_r$$

where $t_f$ is an end time of the trip; $\dot{m}_f$ is a mass flow rate of fuel; I is a battery pack current; $Q_{nom}$ is a battery pack charge capacity; $P_{MGU}^{min}$ is a lower limit of motor mechanical power (generator mode); $P_{MGU}^{max}$ is an upper limit of motor mechanical power (motor mode); $P_{eng}^{min}$ is a lower limit of engine mechanical power; $p_{eng}^{max}$ is an upper limit of engine mechanical power; $\omega_{MGU}$ is an angular speed of the motor; $I^{min}$ is a lower limit of battery current (charging); $I^{max}$ is an upper limit of battery current (discharging); $SoC_r$ is a battery SoC set point; and $P_{br}$ is the power dissipated by mechanical brakes. The battery SoC set point may be typified as a center of a feasible state of charge range for the traction battery pack, i.e., $SoC_r = 0.5*(SoC_{min}+SoC_{max})$. In addition, the SOC state constraint may be defined as $0.3 \leq SoC(t) \leq 0.8$.

Figure 2:
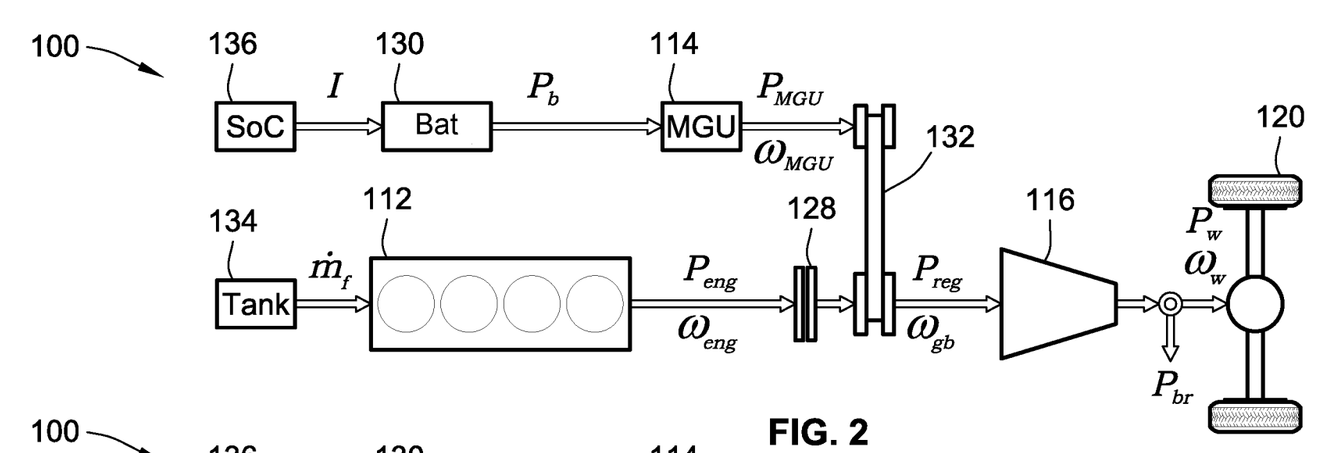
FIG. 2 is a schematic illustration of a representative HEV powertrain architecture with AI-enhanced, nonlinear MPC in accord with aspects of the disclosed concepts.

FIG. 2 illustrates the power flow in a representative P2 hybrid powertrain 100 architecture, which generally comprises an engine assembly 112 and a motor generator unit (MGU) 114 that transmit torque to a multi-speed power transmission 116, e.g., via an engine disconnect clutch 128 and a belt-drive system 132, respectively. The transmission 116 is operable to transfer torque to and from one or more road wheels 120 to propel the vehicle and to generate a recharging electrical current. A vehicle fuel system, represented in FIG. 2 by fuel tank 134, feeds combustible fuel to power the engine 112, whereas electric power may be provided to the MGU 114 by a rechargeable traction battery pack 130. While differing in appearance, it is envisioned that any of the features disclosed with reference to the examples of FIGS. 2-5 may be incorporated, singly or in any combination, into the example of FIG. 1, and vice versa.

A battery sensing device 136 is operable to monitor battery state of charge SoC and current I of the traction battery pack 130. The transfer of multi-phase alternating current I provides battery power $P_b$ to the MGU 114, which responsively generates motor power $P_{MGU}$ at a given rotational speed $\omega_{MGU}$. Along the same lines, the transfer of fuel at a metered mass flow rate $\dot{m}_f$ causes the engine 112 to generate engine power $P_{eng}$ at a given rotational speed $\omega_{eng}$. The combined motor and engine powers $P_{MGU}$ and $P_{eng}$—the "power split"—provide the requested power $P_{req}$ at a corresponding rotational speed $\omega_{gb}$ input to the transmission 116. The requested power $P_{req}$ is output from the transmission 116 to the final drive system as wheel power $P_w$ at wheel speed $\omega_w$; during deceleration, a portion of the vehicle's kinetic energy is dissipated by the vehicle brake system as mechanical brake power $P_{br}$.

Predictive, adaptive energy management for HEV/PHEV power split control may also be utilized in real-time implementations in which vehicle velocities for a predicted path of a given trip are estimated for a sequence of short time intervals [t, $t_p$] for the next $N_p$ steps of a prediction horizon. This predictive energy management control technique helps to minimize the sum of fuel consumption over time intervals [t, $t_p$] as well as an extra fuel consumption value beyond $t_p$ (e.g., in order to achieve charge sustaining at the end time $t_f$). The predictive energy management strategy may be represented as:

$$\min_{P_{MGU}(k)} s(SoC_r - SoC(N_p)) + \sum_{k=0}^{N_p-1} \dot{m}_f(P_{req}(k) - P_{MGU}(k))\Delta t \quad (2)$$

subject to:

$$SoC(k+1) = SoC(k) - \Delta t \frac{I(SoC(k), P_{MGU}(k))}{Q_{nom}}$$

$$P_{MGU}^{min}(\omega_{MGU}(k)) \leq P_{MGU}(k) \leq P_{MGU}^{max}(\omega_{MGU}(k))$$

$$P_{eng}^{min}(\omega_{eng}(k)) \leq P_{req}(k) - P_{MGU}(k) \leq P_{eng}^{max}(\omega_{eng}(k))$$

$$I^{min} \leq I(k) \leq I^{max}$$

$$0.3 \leq SoC(k) \leq 0.8$$

where s is a weighting parameter, resembling an equivalence fuel factor; $\Delta t$ is a sample period; and $t_p$ is a final time of a short prediction window starting from t, $t_p = t + \Delta t * N_p$. For a control system in which more than one kind of resource is to be allocated, an equivalence factor may be used to determine a ratio of required to available resources. For at least some applications, the equivalence factor may be determined by the particular characteristics of the available resources; a fuel equivalence factor, for example, may quantitatively compare the amount of fuel consumed by an engine with electrical energy consumed by a motor. The prediction horizon, on the other hand, is indicative of a time range in which a controlled variable predictive value is taken into consideration. A minimum cost function may also be calculated based on the total vehicle propulsion losses as follows:

$$\min_{P_{MGU}} J =$$

$$\lambda_0(SOCr(Np) - SOC) + \sum_{k=0}^{N_p-1} P_{engineloss} + P_{Motorloss} + P_{Battloss} + P_{APMloss}$$

subject to: $T_{MGU}^{min}(\omega_{MGU}(t)) \leq T_{MGU}(t) \leq T_{MGU}^{max}(\omega_{MGU}(t))$ $T_{eng}^{min}(\omega_{MGU}(t)) \leq T_{eng}(t) \leq T_{eng}^{max}(\omega_{eng}(t))$ and any combination of the other constraints described herein, where $T_{MGU}^{min}$ is a lower limit of motor torque; $T_{MGU}^{max}$ is an upper limit of motor torque; $T_{eng}^{min}$ is a lower limit of engine torque; and $T_{eng}^{max}$ is an upper limit of engine torque. In this instance, motor power $P_{MGU}$ is a function of battery current I(t) and battery open circuit voltage, or $P_{MGU} = f(I(t), OCV)$.

At a sample time t, the optimization equation (2) is solved, and a first step of an optimal control sequence is applied to the closed-loop system. The process is repeated at time $t+\Delta t$ based on new measured and predicted information, yielding a Model Predictive Control (MPC). The equivalence factor s may be converted to a dimensionless equivalence factor $\lambda$ as follows:

$$s = \lambda \frac{Q_{nom}OCV}{LHV} \quad (3)$$

where OCV is an open circuit voltage of the battery pack; and LHV is a lower heating value of fuel being fed to the engine assembly. Dimensionless equivalence factor $\lambda$ is a lumped parameter for the energy conversion efficiencies of multiple components. By way of non-limiting example, $\lambda$ is typically between 1.8 and 2.2, regardless of battery capacity and voltage. As described below, calibration of $\lambda$ may be based on predicted vehicle speeds on a driving route (A:B).

In equation (3), the dimensionless equivalence factor $\lambda$ may initially be determined by a series of predicted vehicle speeds on a predicted path for a given trip. For instance, using a chart of SoC deviation ($SoC(t_f)$–$SoC(0)$) versus equivalence factor $\lambda$ on a drive cycle, the system sweeps $\lambda$ in a feasible range, and selects a value that leads to sustaining battery charge, i.e., $SoC_{end}$–$SoC_0$=0. Adaptation of $\lambda$ may then be applied at selected time intervals, for example $t_1$, as follows:

$$\lambda(t_1) \approx \frac{1 - cE_{rgn,a}(t_1)}{1 - cE_{rgn,p}} \lambda(t_0)$$

where $\lambda(t_0)$ is an estimated $\lambda$ at $t_0$, based on a predicted vehicle velocity over $[t_0, t_f]$; $\lambda(t_1)$ is an adapted $\lambda$ at $t_1$, based on an actual vehicle velocity over $[t_0, t_1]$; c is a small calibration number; $E_{rgn,p}$ is a regenerated battery chemical energy, based on the predicted velocity over $[t_0, t_f]$; and $E_{rgn,a}(t_1)$ is a corrected energy at $t_1$, based on the actual velocity over $[t_0, t_1]$ and the predicted velocity over $[t_1, t_f]$.

Continuing with the above discussion of predictive and adaptive energy management for HEV/PHEV power split control, adaptation of $\lambda$ may be conducted for every time step, based on a predicted SoC at prediction horizon $N_p$, as opposed to measured SoC in the manner employed in Adaptive Equivalent Consumption Minimization Strategy (A-ECMS). In this representative implementation, predictive energy management control may be represented as:

$$\min_{P_{MGU(k)}} \left[ s_0 + \frac{k_P}{2}(SoC_r - SoC(N_p)) \right](SoC_r - SoC(N_p)) + \sum_{k=0}^{N_p-1} \dot{m}_f(P_{req}(k) - P_{MGU}(k))\Delta t$$

subject to the constraints set forth above with respect to equation (2), where $s_0$ is a nominal equivalence factor at the set point $SoC_r$; and $k_p$ is a proportional control gain penalizing a deviation from the set point $SoC_r$. Calibration of $\lambda_0$ and $K_p$ may be conducted off-line based on a combination of selected representative driving cycles using Dynamic Programming to optimize the cost with SOC tracking; an average sensitivity of optimal fuel consumption with respect to SOC may be calculated.

The parameters $s_0$ and $k_P$ may be determined using historical driving data of a subject vehicle and/or representative driving cycles for a given trip. In a non-limiting example, a cost-to-go function V(t, x) is calculated for a given velocity profile of a trip using Dynamic Programming (DP). V(t, x) represents a minimum fuel energy consumption to finish the remaining trip over $[t, t_f]$, with the initial condition SoC(t)=x. Dynamic Programming is a recursive optimization method for solving a complex problem by breaking it down into a collection of simpler sub-problems. Each sub-problem is solved once, and their solutions stored using a memory-based data structure for future reference. For each time step t, a shift V is made along a V-axis, such that there is no penalty at SoC set point, or $V_\Delta(t, x)$=V(t, x)–V(t, $SoC_r$). Assuming $V_\Delta(t, x)$ are independent samples at different reference times t, $V_\Delta$ is averaged along a t-axis:

$$V_{avg}(x) = \frac{1}{N}\sum_{k=0}^{N-1} V_\Delta(t_k, x)$$

After averaging $V_\Delta$, $\lambda_0$ and $k_p$ are identified from a quadratic approximation of the cost-to-go function:

$$\frac{V_{avg}(x)}{LHV} \approx \frac{1}{2}k_P(SoC_r - x)^2 + s_0(SoC_r - x)$$

In general, the summed minimum cost function is sampled and calculated within a time frame window corresponding to a selected road segment moving along the planned path. The weighting factor s in the minimum cost function is provided to balance the vehicle traction power contributions from both engine power output and electric motor power output, such that the battery state of charge is sustained during the whole trip and the engine fuel consumption is minimized.

Figure 3:
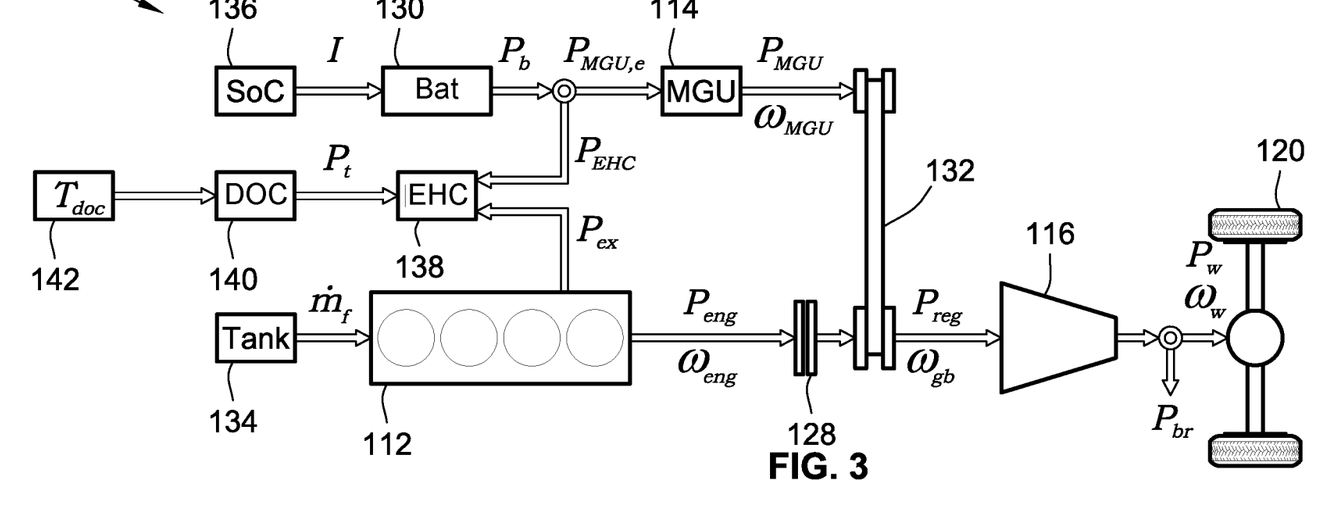
FIG. 3 is a schematic illustration of another representative HEV powertrain architecture with AI-enhanced, nonlinear MPC in accord with aspects of the disclosed concepts.

In addition to performing energy management for HEV/PHEV power split control, aspects of the disclosed concepts relate to distributed energy and thermal management for hybrid powertrains with engine exhaust systems having active exhaust aftertreatment devices. FIG. 3, for example, presents the power flow for another representative P2 hybrid powertrain with an exhaust aftertreatment system. The exhaust aftertreatment system is represented in FIG. 3 by a Diesel Oxidation Catalyst (DOC) 140 (or a three-way gasoline catalyst) that is connected with an Electrically Heated Catalyst (EHC) 138 that is operable to warm the DOC 140 to its light-off temperature, e.g., 250° C. during a cold start. A DOC sensing device 142 is operable to monitor a DOC temperature $T_{doc}$ and a thermal rate of change $P_t$ of thermal energy stored in the DOC 140. In this configuration, a portion of the battery power $P_b$ is diverted to the EHC 138 as EHC power $P_{EHC}$. Additional DOC heating may be achieved, if so desired, by way of engine exhaust thermal energy $P_{ex}$.

The electrical energy coupling between the MGU 114 and EHC 138, as well as the thermal energy coupling between the EHC 138 and engine exhaust, may operate as constraints in the design of a distributed energy and thermal management system. Assuming the DOC 140 is a lumped thermal mass and the engine exhaust variables may act as static maps of engine operating conditions, the DOC temperature $T_{doc}$ (e.g., in Kelvin (K)) may be modelled during cold start as:

$$C_t \frac{dT_{doc}}{dt}(t) = c_p \dot{m}_{ex}(T_{ex} - T_{doc}) - hA(T_{doc} - T_a) + \eta_{EHC} P_{EHC} \quad (4)$$

$$\frac{dT_{doc}}{dt}(t) = -\frac{P_t}{C_t}$$

where $C_t$ is a DOC heat capacity [J/K]; $c_p$ is a specific heat capacity of exhaust gases; $\dot{m}_{ex}$ is an engine exhaust mass flow rate; $T_{ex}$ is an engine exhaust temperature; hA is a product of a convective heat transfer coefficient h and an outer surface area A of the DOC; $T_a$ is an ambient temperature; $\eta_{EHC}$ is an EHC electrical-to-thermal efficiency; $P_{EHC}$ is an EHC electrical power; and $P_t$ is a rate of change of thermal energy stored in the DOC. EHC power $P_{EHC}$ may be determined by a thermostat control, in favor of rapid warm-up, as:

$$P_{EHC}(t) = \begin{cases} P_{EHC}^{max} & t < t_1 \\ 0 & t \geq t_1 \end{cases}$$

where $P_{EHC}^{max}$ is a maximum power of the ECH; and $t_1$ is a DOC warm-up time (e.g., $T_{doc}(t_1)=250°$ C.).

Given a velocity trajectory and a build-in EHC control, the optimal energy and thermal management strategy includes determining the power split between engine and MGU and the DOC warm-up time such that the total fuel consumption for the entire trip is minimized. Respecting the component constraints and sustaining the battery SoC, optimal energy and thermal management may be calculated as:

$$\min_{P_{MGU}(t), t_1} \int_0^{t_1} \dot{m}_f(P_{req}(t) - P_{MGU}(t))dt + \int_{t_1}^{t_f} \dot{m}_f(P_{req}(t) - P_{MGU}(t))dt$$

subject to:

$$\frac{dSoC}{dt}(t) = -\frac{I(SoC(t), P_{MGU}(t))}{Q_{nom}}$$

$$\frac{dT_{doc}}{dt}(t) = -\frac{P_t(T_{doc}(t), P_{MGU}(t), P_{req}(t), P_{EHC}(t))}{C_t}$$

$$SoC(t_f) = SoC(0)$$

$$T_{doc}(t_1) = 250°C.$$

as well as any of the other constraints described herein. This switched optimal control may be solved by the Hybrid Minimum Principle and a shooting method. An optimal solution may reduce warm-up time by at least about 10-15% with reduced fuel consumption.

In a real-time implementation, the distributed energy and thermal management strategy is designed to minimize a weighted sum of fuel consumption, equivalent fuel of battery, and equivalent fuel of DOC. The distributed energy and thermal management strategy may be represented as follows, while respecting the component constraints:

$$\min_{P_{MGU}(k)} s_s(SoC_r - SoC(N_p)) + s_t(T_{doc,r} - T_{doc}(N_p)) + \sum_{k=0}^{N_p-1} \dot{m}_f(k)\Delta t$$

subject to:

$$SoC(k+1) = SoC(k) - \Delta t \frac{I(SoC(k), P_{MGU}(k))}{Q_{nom}}$$

$$T_{doc}(k+1) = T_{doc}(k) - \Delta t \frac{P_t(T_{doc}(k), P_{MGU}(k), P_{req}(k), P_{EHC}(k))}{C_t}$$

as well as any of the other constraints described herein, where $T_{doc,r}$ is a DOC light-off temperature (e.g., $T_{doc,r}=250°$ C.); $s_s$ is an equivalence factor on battery chemical energy; and $s_t$ is an equivalence factor on DOC thermal energy. Adaptation of the chemical energy equivalence factor $s_s$ may comprise:

$$s_s(t) = s_0 + k_p(SoC_r - SoC(t+N_p\Delta t))$$

where the thermal energy equivalence factor $s_t$ is initialed according to a warm-up priority index $\alpha \in [0,1]$, and then is adapted as follows:

$$s_t(0) = k_3\alpha^3 + k_2\alpha^2 + k_1\alpha$$

$$\frac{ds_t}{dt}(t) = \frac{c_p\dot{m}_{ex} + hA}{C_t}s_t(t)$$

The cubic function of $s_t(0)$ may be identified from the HMP shooting results.

To summarize, a nonlinear MPC control protocol with SOC terminal cost is provided to optimize fuel consumption in power split output control for hybrid powertrains, while maintaining a desired SOC level. Calibration methods are also presented for estimating an MPC cost function weight that represents a fuel equivalence factor based on predicted preview route information. Also presented is calibration of MPC cost function weights using Dynamic Programming. Adaptation of MPC cost function weights may also be achieved using predicted and historic vehicle data, such as regenerative energy during a given trip.

Other aspects of the disclosed concepts relate to novel MPC control of both HEV energy management and thermal management during a cold start operation. MPC cost function weights may be defined as equivalence fuel factors that are imposed on terminal conditions for SOC tracking and catalyst warm-up temperature tracking. In addition, unique calibration methods are provided for initial values of equivalent fuel factors based on solving original global optimization problems using the Hybrid Minimum Principle. Motor equivalence fuel factors may be designed using baseline MPC control for energy management. Also presented are catalyst heating equivalence fuel factors that are designed by solving a first order differential equation based on a catalyst model.

Figure 4:
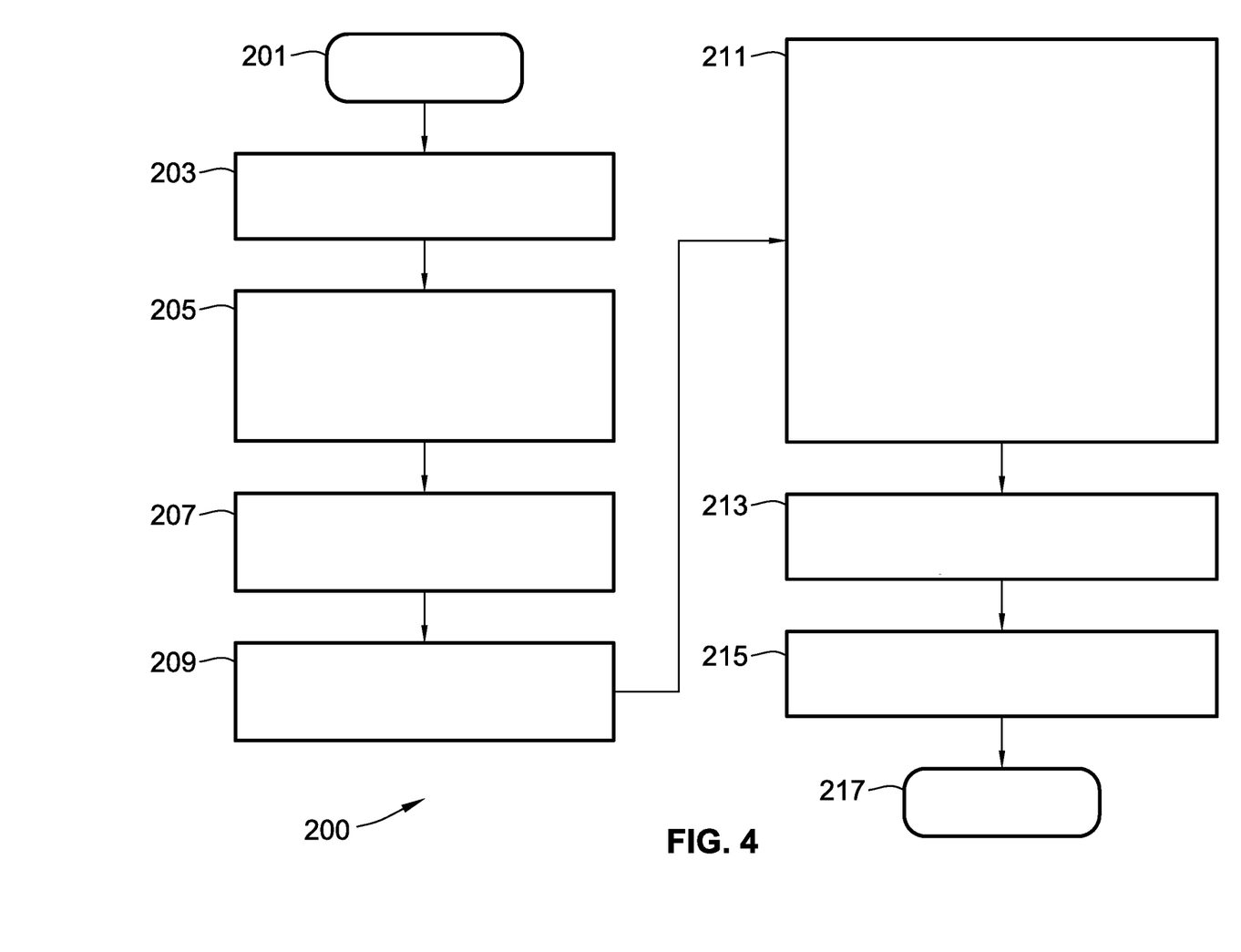
FIG. 4 is a flowchart illustrating a representative powertrain control algorithm with AI-enhanced, nonlinear MPC of power split output optimization for fuel consumption minimization, which may correspond to memory-stored instructions executed by an onboard or remote controller, control-logic circuitry, programmable electronic control unit, or other integrated circuit (IC) device or a network of IC devices in accord with aspects of the disclosed concepts.
Figure 5:
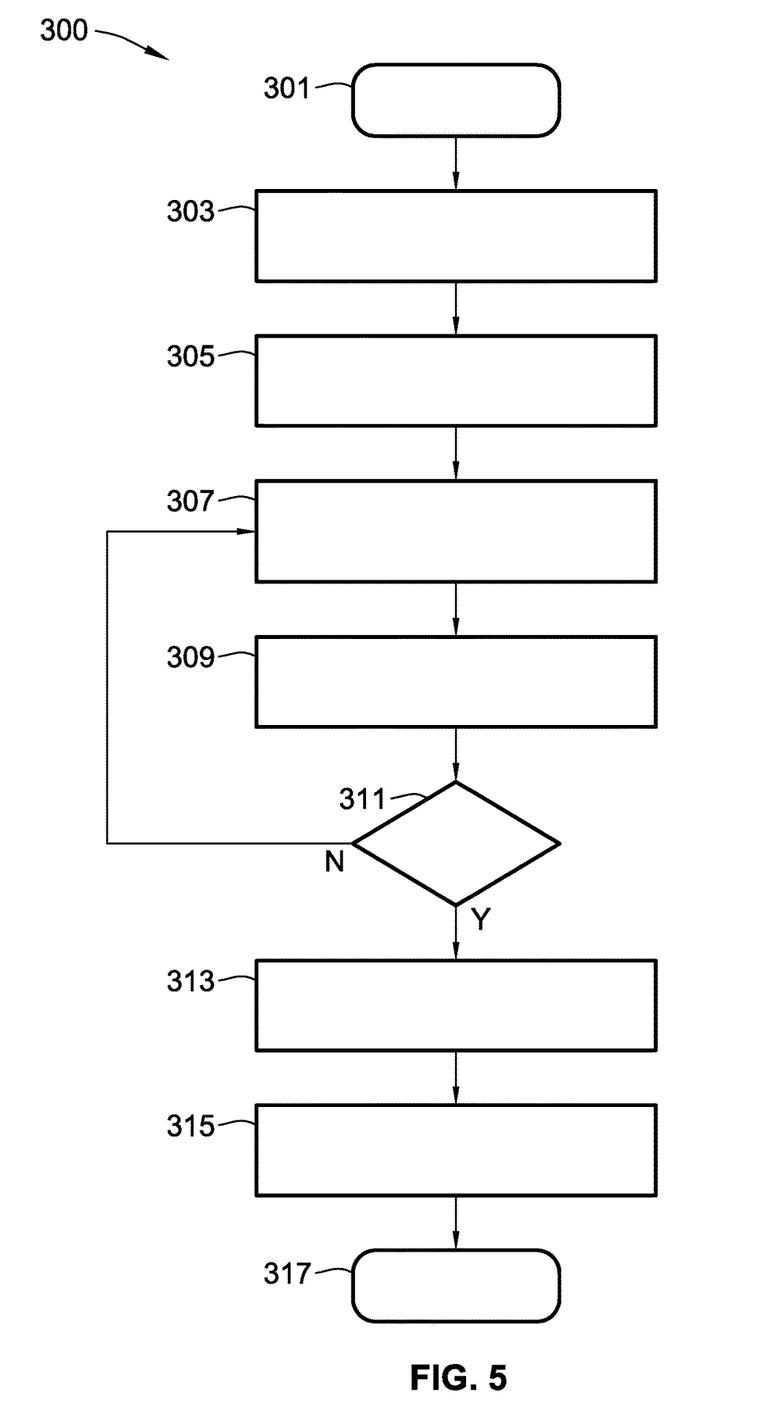
FIG. 5 is a flowchart illustrating a representative powertrain control algorithm with AI-enhanced, nonlinear MPC of energy and thermal management using two-stage MPC, which may correspond to memory-stored instructions executed by an onboard or remote controller, control-logic circuitry, programmable electronic control unit, or other integrated circuit (IC) device or a network of IC devices in accord with aspects of the disclosed concepts.

With reference now to the flow chart of FIG. 4, an improved method or control strategy for nonlinear MPC of power split output of a hybrid powertrain, such as the powertrains illustrated in FIGS. 1-3, to minimize total fuel consumption of a vehicle, such as electric-drive vehicle 10 of FIG. 1, is generally described at 200 in accordance with aspects of the present disclosure. Likewise, FIG. 5 presents at 300 an improved method or control strategy for nonlinear MPC of energy and thermal management of a hybrid powertrain using two-stage MPC in accordance with aspects of the present disclosure. Some or all of the operations illustrated in FIGS. 4 and 5 and described in further detail below may be representative of an algorithm or algorithms that correspond to processor-executable instructions that may be stored, for example, in main or auxiliary or remote memory, and executed, for example, by an on-board or off-board controller, processing unit, control logic circuit, or other module or device, to perform any or all of the above or below described functions associated with the disclosed concepts. It should be recognized that the order of execution of the illustrated operation blocks may be changed, additional blocks may be added, and some of the blocks described may be modified, combined, or eliminated.

Method 200 begins at terminal block 201 of FIG. 4 with processor-executable instructions for a programmable controller or control module or similarly suitable processor to call up an initialization procedure for a nonlinear MPC power split control protocol. This routine may be executed in real-time, continuously, systematically, sporadically, and/or at regular intervals during active or autonomous vehicle operation. As yet another option, block 201 may initialize responsive to a user prompt from an occupant of the vehicle, such as one or more electrical signals indicating the vehicle's driver has selected a desired destination for a given trip. To carry out this protocol, a vehicle control system or any combination of one or more subsystems may be operable to receive, process, and synthesize pertinent information and inputs, and execute control logic and algorithms to regulate various powertrain system, fuel system, battery system, and/or brake system components to achieve desired control targets.

As part of the initialization procedure at block 201, for example, a resident vehicle telematics unit or other similarly suitable Human Machine Interface (HMI) may execute a navigation processing code segment, e.g., to obtain vehicle data (e.g., geospatial data, speed, heading, acceleration, timestamp, etc.), and optionally display select aspects of this data to an occupant of the vehicle 10. The occupant may employ any of the HMI input controls to then select a desired destination for the vehicle from a current location or an expected origin. Path plan data may be generated with a predicted path for the vehicle to travel from origin to destination. It is also envisioned that the ECU or telematics unit processors receive vehicle origin and vehicle destination information from other sources, such as a server-class computer provisioning data exchanges for a cloud computing system or a dedicated mobile software application operating on a smartphone or other handheld computing device.

Upon initialization of the nonlinear MPC power split control protocol at block 201, method 200 proceeds to process block 203 with memory-stored, processor-executable instructions to estimate vehicle trajectories for the designated trip. This may comprise the vehicle controller determining, based on the aforesaid path plan data, estimated vehicle velocities for a plurality of rolling road segments of the predicted path. A rolling road segments may be defined to mean a discretized segment of roadway that may overlap in portion with a previous and/or subsequent road segment with only one or a few sample time differences. Method 200 then advances to process block 205 to determine an optimal power split between engine power output and motor power output to minimize fuel consumption for the desired trip. For instance, the vehicle controller may determine, based on the estimated vehicle velocities, a respective estimated power request for each rolling road segment, where each estimated power request includes an engine power output and a motor power output. Process block 205 may also identify an optimal time $t_1$ for DOC light-off in system configurations with an active exhaust aftertreatment device.

With continuing reference to FIG. 4, the method 200 continues to process block 207 and calculates a minimum cost function of motor power such that a summation of fuel consumption to generate the engine power outputs for the rolling road segments of the predicted path is minimized. This minimized cost function may be calculated as:

$$\text{Min } J(u,t1) = \int_0^{t_1} Pf(x,u) + \int_{t_1}^{t_f} Pf(x,u)$$

Once calculated, the method 200 proceeds to process block 209 and formulates an optimal control problem as a Pontryagin's Maximum Principle (PMP) control problem. The PMP control problem may be represented as:

$$\min_{u,t1} H(x,u,\lambda,t,t_1) = \lambda_1 \dot{E}_s + \lambda_2 \dot{E}_t + Pf(x,u)$$

After formulating the PMP control problem, method 200 executes an inquiry of the PMP control problem subject to one or more predefined constraints, as indicated at process block 211. These constraints may include dynamic system model constraints, engine torque min/max constraints, motor power min/max constraints, SOC min/max constraints, battery power constraints, battery SOC charge sustaining constraints, catalyst light-off temp constraints, etc. Co-states for the PMP control problem may include a motor equivalence fuel factor $\lambda_1$ and an electric heating equivalence fuel factor $\lambda_2$.

At process block 213 of FIG. 4, method 200 translates engine torque and motor torque, subject to SOC and battery power constraints, as well as a single motor torque min/max constraint. Advancing to process block 215, the method 200 formulate an on-board MPC control strategy based on designed co-states. Process block 215 may further comprise the vehicle controller transmitting one or more command signals to the engine and motor to output engine torque and motor torque based on the calculated minimum cost function of motor power. At this juncture, the method 200 of FIG. 4 may advance from process block 215 to terminal block 217 and terminate, or may loop back to terminal block 201 and run in a continuous loop.

Method 300 of FIG. 5 begins at terminal block 301 with processor-executable instructions for a programmable controller or control module or similarly suitable processor to call up an initialization procedure for a nonlinear MPC energy and thermal management control protocol. Terminal block 301 of FIG. 5 may be executed in accordance with any of the options described above with respect to terminal block 201 of FIG. 4. In the same vein, the methods 200 and 300 may be combined into a single algorithm, executed as separate discrete software applications, or amalgamated into any logical combination of the disclosed process operations. Once initialized, the method 300 advances to process block 303 to design an initial equivalence factor $s_s$ ($s_1$) as a baseline MPC parameter for power split-only control.

With continuing reference to FIG. 5, process block 305 includes instructions to initialize an equivalence factor $s_t$ according to a correlation between $s_t(0)$ and $\alpha$. Method 300 then proceeds to process block 307 to update $s_t$ according to:

$$\frac{ds_t}{dt} = \frac{c_p \dot{m}_{ex} + hA}{C_t} s_t$$

Process block 309 comprises calculating an MPC optimal control for both energy and thermal management.

After calculating the optimal MPC control, method 300 advances to decision block 311 and determines whether or not DOC light-off has occurred. If not (block 311=NO), the method 300 returns to process block 307 and iterates back through the operations subsequent thereto. Responsive to a determination that DOC light-off has occurred (block 311=YES), the method 300 moves to process block 313 and sets the equivalence factor $s_t$ equal to zero. Process block 315 then provides instructions for calculating an MPC optimal control for post warm-up energy management. A resident vehicle controller may responsively transmit command signals through a powertrain control module (PCM) and an exhaust system control module (ECM) to execute powertrain and exhaust system operations in accordance with the MPC control. At this juncture, the method 300 of FIG. 5 may advance from process block 315 to terminal block 317 and terminate, or may loop back to terminal block 301 and run in a continuous loop.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a CD-ROM, a floppy disk, a hard drive, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method for controlling a hybrid powertrain of a vehicle, the vehicle including multiple road wheels, an engine and a motor both operable to drive one or more of the road wheels to thereby propel the vehicle, a traction battery pack operable to power the motor, and a vehicle controller programmed to regulate operation of the motor and the engine, the method comprising:

determining, via the vehicle controller, path plan data including a vehicle origin, a vehicle destination, and a predicted path for the vehicle;

determining, via the vehicle controller based on the path plan data, respective estimated velocities of the vehicle for a plurality of rolling road segments of the predicted path;

determining, via the vehicle controller based on the estimated velocities, respective estimated power requests for the rolling road segments, each of the estimated power requests including a transmission input torque and/or a vehicle axle torque;

calculating, via the vehicle controller, a minimum cost function of motor power such that a summation of fuel consumption to generate engine power outputs for the rolling road segments of the predicted path is minimized, wherein calculating the minimum cost function is subject to maximum and minimum battery current limits of the traction battery pack and a state of charge (SOC) terminal cost at an end of each of the rolling road segments; and transmitting, via the vehicle controller, an engine command signal to the engine and a motor command signal to the motor to output engine torque and motor torque, respectively, based on the calculated minimum cost function of motor power, wherein the minimum cost function of motor power is calculated as:

$$\min_{P_{MGU}(k)} s(SoC_r - SoC(N_p)) + \sum_{k=0}^{N_p-1} \dot{m}_f(P_{ref}(k) - P_{MGU}(k))\Delta t$$

where $P_{MGU}(k)$ is a motor power of the motor at a time step k; s is an equivalence factor; $SoC_r$ is an SOC setpoint of the traction battery pack; $SoC(N_p)$ is an SOC of a battery of the traction battery pack at another time step $N_p$; $\dot{m}_f$ is a mass flow rate of fuel to the engine; $P_{req}(k)$ is a requested power output of the hybrid powertrain at the time step k; and $\Delta t$ is a sample period.

2. The method of claim 1, wherein calculating the minimum cost function is further subject to an SOC state constraint $SoC_{min} \leq SoC(t) \leq SoC_{max}$, where $SoC_{min}$ is a lower battery SOC limit for the traction battery pack; $SoC_{max}$ is an upper battery SOC limit for the traction battery pack; and $SoC(t)$ is the battery SoC at time t.

3. The method of claim 1, wherein calculating the minimum cost function is further subject to engine power limit constraints of the engine and motor power limit constraints of the motor.

4. The method of claim 3, wherein the engine power limit constraints include $P_{eng}^{min}(\omega_{eng}(k)) \leq P_{req}(k) - P_{MGU}(k) \leq P_{eng}^{max}(\omega_{eng}(k))$, where $P_{eng}^{min}$ is a lower engine power limit of the engine; $P_{eng}^{max}$ is an upper engine power limit of the engine; and $\omega_{eng}(k)$ is an angular speed of the engine at the time step k.

5. The method of claim 3, wherein the motor power limit constraints include $P_{MGU}^{min}(\omega_{MGU}(k)) \leq P_{MGU}(k) \leq P_{MGU}^{max}(\omega_{MGU}(k))$, where $P_{MGU}^{min}$ is a lower motor power limit of the motor; $P_{MGU}^{max}$ is an upper motor power limit of the motor; and $\omega_{MGU}(k)$ is an angular speed of the motor at the time step k.

6. The method of claim 1, wherein calculating the minimum cost function is further subject to an SOC charge sustaining constraint $SoC(t_f) = SoC(0) = SoC_r$, where $SoC(t_f)$ is an SOC of the traction battery pack at the vehicle destination at the end of the predicted path; and SoC(0) is an SOC of the traction battery pack at the vehicle origin at the start of the predicted path.

7. The method of claim 1, wherein the state of charge (SOC) terminal cost is equal to $s(SoC_r - SoC(N_p))$.

8. The method of claim 1, wherein calculating the minimum cost function is further subject to a state of charge discrete-time dynamics:

$$SoC(k+1) = SoC(k) - \Delta t \frac{I(SoC(k), P_{MGU}(k))}{Q_{nom}}$$

where $SoC(k+1)$ is an SOC of the traction battery pack at a time step k+1; $SoC(k)$ is an SOC of the traction battery pack at the time step k; I is a battery current of the traction battery pack; and $Q_{nom}$ is a battery charge capacity of the traction battery pack.

9. The method of claim 1, wherein the equivalence factor s is calculated as:

$$s = \lambda \frac{Q_{nom} OCV}{LHV}$$

where $\lambda$ is a dimensionless equivalence factor; $Q_{nom}$ is a battery charge capacity of the traction battery pack; OCV is an open circuit voltage of the traction battery pack; and LHV is lower heating value for fuel being fed to the engine.

10. The method of claim 9, wherein the dimensionless equivalence factor $\lambda$ is adapted as:

$$\lambda(t_1) \approx \frac{1 - cE_{rgn,a}(t_1)}{1 - cE_{rgn,p}} \lambda(t_0)$$

where $\lambda(t_0)$ is an estimated equivalence factor at an initial time $t_0$ based on a predicted velocity over $[t_0, t_f]$; $\lambda(t_1)$ is an adapted equivalence factor at a first time $t_1$ based on an actual velocity over $[t_0, t_1]$; c is a calibration number; $E_{rgn,p}$ is a regenerated battery chemical energy based on the predicted velocity over $[t_0, t_f]$; and $E_{rgn,a}(t_1)$ is a corrected battery chemical energy at the first time $t_1$ based on the actual velocity over $[t_0, t_1]$ and the predicted velocity over $[t_1, t_f]$.

11. The method of claim 10, wherein the dimensionless equivalence factor $\lambda$ is adapted for each of a plurality of discrete time steps based on a predicted SOC at the prediction horizon.

12. The method of claim 11, wherein adaptation of the dimensionless equivalence factor $\lambda$ results in the minimum cost function being calculated as:

$$\min_{P_{MGU}(k)} \left[ s_0 + \frac{k_P}{2}(SoC_r - SoC(N_p)) \right](SoC_r - SoC(N_p)) + \sum_{k=0}^{N_p-1} \dot{m}_f(P_{req}(k) - P_{MGU}(k))\Delta t$$

where $s_0$ is a nominal equivalence factor at the set point $SoC_r$; and $k_p$ is a proportional control gain penalizing the deviation from the set point $SoC_r$.

13. The method of claim 12, further comprising determining the nominal equivalence factor $s_0$ and the proportional control gain $k_p$ using historical driving data and/or a set of representative driving cycles given a velocity profile of the predicted path for the vehicle.

14. An electric-drive vehicle comprising:

a vehicle body with an axle and a plurality of road wheels operatively mounted to the vehicle body;

a powertrain including a prime mover and a transmission, the prime mover attached to the vehicle body and configured to drive one or more of the road wheels to thereby propel the vehicle, the prime mover including an electric traction motor and an internal combustion engine assembly, and the transmission drivingly connecting the engine assembly and/or the traction motor to the one or more of the road wheels;

a traction battery pack operable to power the electric traction motor; and a vehicle controller configured to regulate operation of the traction motor and the engine assembly, the vehicle controller being programmed to:

determine path plan data including a vehicle origin, a vehicle destination, and a predicted path to travel from the vehicle origin to the vehicle destination;

determine, based on the path plan data, a respective estimated velocity of the vehicle for each of a plurality of rolling road segments of the predicted path;

determine, based on the estimated velocities, a respective estimated power request for each of the rolling road segments, each of the estimated power requests including a transmission input torque of the transmission and/or a vehicle axle torque of the axle;

calculate a minimum cost function of motor power such that a summation of fuel consumption to generate engine power outputs for the rolling road segments of the predicted path is minimized, wherein calculating the minimum cost function is subject to maximum and minimum battery current limits of the traction battery pack and a state of charge (SOC) terminal cost at an end of each of the rolling road segments; and transmit an engine command signal to the engine and a motor command signal to the motor to output engine torque and motor torque, respectively, based on the calculated minimum cost function of motor power, wherein the minimum cost function of motor power is calculated as:

$$\min_{P_{MGU}(k)} s(SoC_r - SoC(N_p)) + \sum_{k=0}^{N_p-1} \dot{m}_f(P_{req}(k) - P_{MGU}(k))\Delta t$$

where $P_{MGU}(k)$ is a motor power of the motor at a time step k; s is an equivalence factor; $SoC_r$ is an SOC setpoint of the traction battery pack; $SoC(N_p)$ is an SOC of a battery of the traction battery pack at another time step $N_p$; $\dot{m}_f$ is a mass flow rate of fuel to the engine; $P_{req}(k)$ is a requested power output of the hybrid powertrain at the time step k; and $\Delta t$ is a sample period.

15. The electric-drive vehicle of claim 14, wherein calculating the minimum cost function is further subject to a state constraint $I^{min} \leq I(k) \leq I^{max}$, where $I^{min}$ is a lower battery current limit for the traction battery pack; $I^{max}$ is an upper battery current limit for the traction battery pack; and $I(k)$ is a battery current at the time step k.

16. The electric-drive vehicle of claim 14, wherein calculating the minimum cost function is further subject to engine power limit constraints of the engine and motor power limit constraints of the motor.

17. The electric-drive vehicle of claim 14, wherein calculating the minimum cost function is further subject to an SOC charge sustaining constraint $SoC(t_f)=SoC(0)=SoC_r$, where $SoC(t_f)$ is an SOC of the traction battery pack at the vehicle destination at the end of the predicted path; and $SoC(0)$ is an SOC of the traction battery pack at the vehicle origin at the start of the predicted path.

18. The electric-drive vehicle of claim 14, wherein the equivalence factor s is calculated as:

$$s = \lambda \frac{Q_{nom} OCV}{LHV}$$

where $\lambda$ is a dimensionless equivalence factor; $Q_{nom}$ is a battery charge capacity of the traction battery pack; OCV is an open circuit voltage of the traction battery pack; and LHV is lower heating value for fuel being fed to the engine.

19. The electric-drive vehicle of claim 14, wherein the SOC terminal cost is equal to $s(SoC_r - SoC(N_p))$.

20. The electric-drive vehicle of claim 14, wherein calculating the minimum cost function is further subject to an SOC state constraint $SoC_{min} \leq SoC(t) \leq SoC_{max}$, where $SoC_{min}$ is a lower battery SOC limit for the traction battery pack; $SoC_{max}$ is an upper battery SOC limit for the traction battery pack; and $SoC(t)$ is the battery SoC at time t.

* * * * *